G. F. THOMPSON.
METHOD AND APPARATUS FOR HANDLING SEED COTTON.
APPLICATION FILED FEB. 23, 1915.

1,242,271.

Patented Oct. 9, 1917.

WITNESSES:

INVENTOR
G. F. Thompson
ATTORNEY

G. F. THOMPSON.
METHOD AND APPARATUS FOR HANDLING SEED COTTON.
APPLICATION FILED FEB. 23, 1915.

1,242,271.

Patented Oct. 9, 1917.
5 SHEETS—SHEET 3.

WITNESSES:
INVENTOR
G.F. Thompson
BY
ATTORNEY

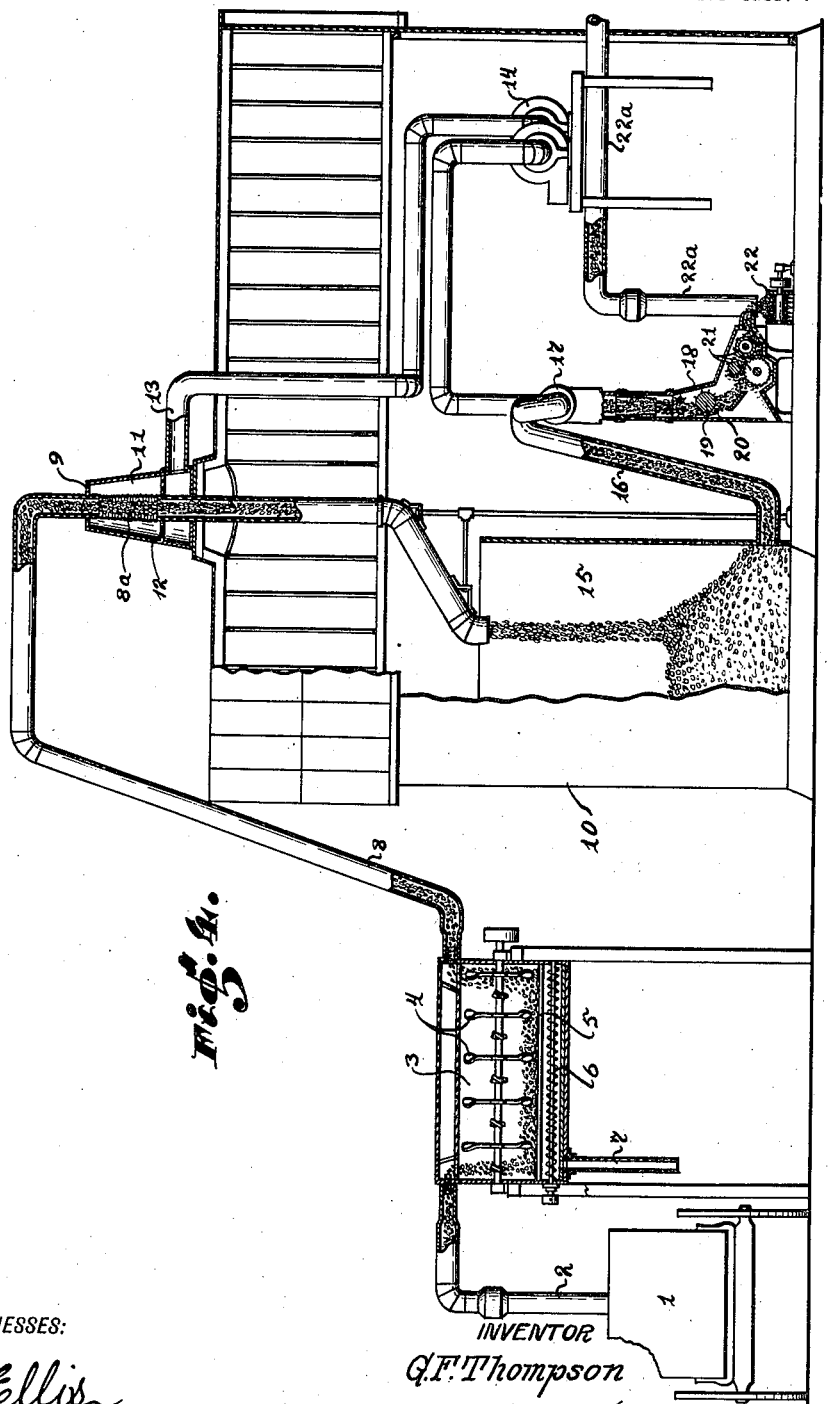

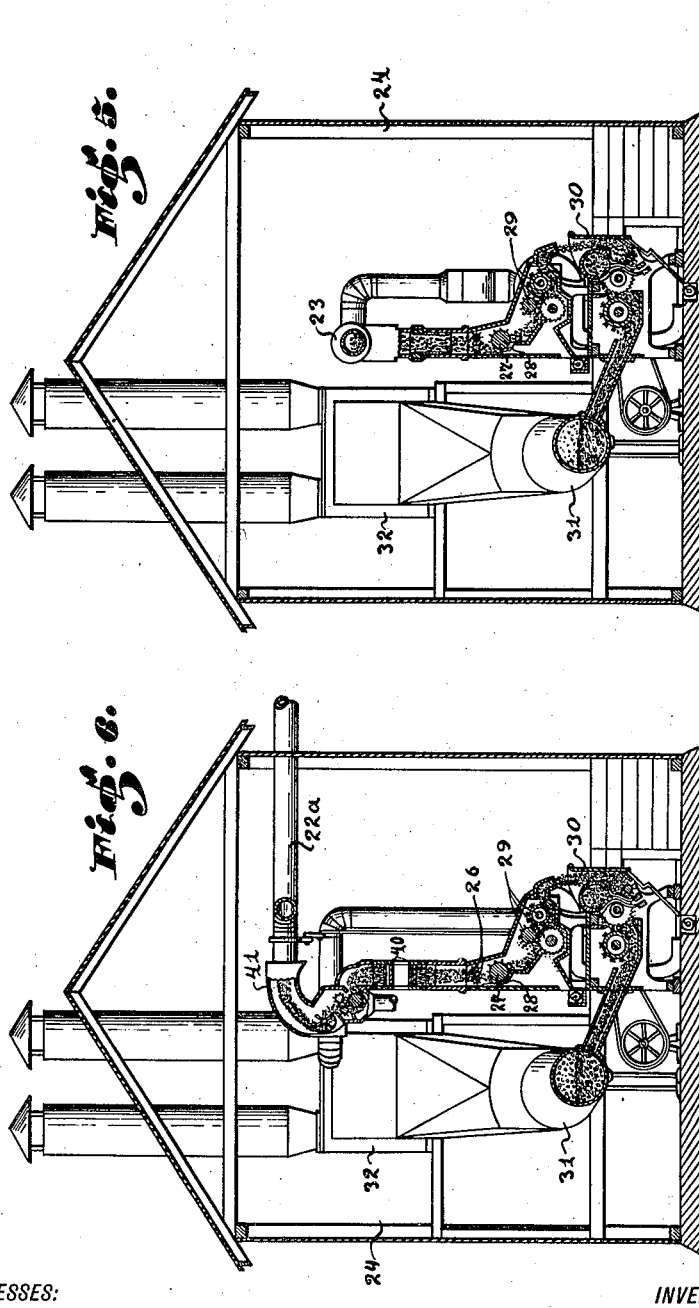

UNITED STATES PATENT OFFICE.

GEORGE F. THOMPSON, OF McKINNEY, TEXAS, ASSIGNOR OF ONE-TENTH TO JOE ELLENBERG, ONE-TENTH TO GEORGE H. PROVINE, TWO-TENTHS TO JOE F. DULANEY, AND TWO-TENTHS TO JIM THOMPSON, ALL OF McKINNEY, TEXAS.

METHOD AND APPARATUS FOR HANDLING SEED-COTTON.

1,242,271.  Specification of Letters Patent.  Patented Oct. 9, 1917.

Application filed February 23, 1915. Serial No. 9,883.

*To all whom it may concern:*

Be it known that I, GEORGE F. THOMPSON, a citizen of the United States, residing at McKinney, in the county of Collin and State of Texas, have invented certain new and useful Improvements in Methods of and Apparatus for Handling Seed-Cotton, of which the following is a specification.

My invention has relation to a method of and apparatus for treating seed cotton and comprises in its entirety a system of handling cotton as it comes from the field until it leaves the gin, the operation being continuous and the resultant product being improved in appearance and grade.

My system is especially useful in the handling of what is known as bolly cotton which cotton was immature during the picking season and remained on the stalks to be plucked with the bolls when cold weather has ripened the plant. Such cotton, namely bolly cotton, brings a very low price in the market and its grade is such that it can be sold only when low grade cotton is in demand.

By handling such bolly cotton in my improved apparatus I can give to the cotton a recognized market value by so improving the appearance and grade of the cotton that the cotton so treated may be readily and profitably sold.

In the carrying out of my invention certain instrumentalities are employed in prescribed order to perform the function of my apparatus. These instrumentalities include a cleaning mechanism, an elevating and distributing mechanism, breaking, cleaning and boll separating mechanisms, separating, cleaning and feeding mechanisms and a ginning mechanism and the system requires the use of two houses known as a cotton storage house and a gin house. The cotton is conveyed from a wagon to a cleaning mechanism outside the storage house and through the cleaning mechanism by suction to an elevating and dropping means inside the storage house. From the bins of the dropper the cotton is conveyed by pneumatic conveyer or by vacuum box and belt distributer to the breaking, cleaning and boll separating mechanism and passed through the same. The cotton is next conveyed by belt drag and suction to a pneumatic elevator or belt distributer and thence to and through a cleaning and feeding mechanism located in the gin house directly above and communicating as a feeder directly with the gin. The overflow cotton from belt distributer leading to the boll separating mechanism and from belt distributer leading to the cleaning and feeding mechanism is conveyed by suction to the respective mechanisms from which they have overflowed, so that every particle of the cotton is caused to traverse first a breaking, cleaning and boll separating mechanism and second a cleaning and feeding mechanism before it reaches the gin.

I have found by observation and experiment that the subjection of the cotton to a breaking, cleaning and boll separating mechanism prior to its introduction to a final cleaning and feeding mechanism and thence to the gin, prepares the cotton for the cleaning and feeding operation in that the boll is opened, the cotton is loose and fibrous, and the moisture in the cotton is appreciably removed before the cotton passes through the final cleaning means and I regard as highly important that step or steps in my method wherein the cotton is subjected to a combined boll breaking, cleaning and separating means prior to its introduction to a boll cleaning and cotton feeding mechanism and its entrance to the gin.

In the carrying out of my invention I have illustrated only such instrumentalities as are well known to the ginner and I make no claim to the particular or specific construction of such instrumentalities since other and equivalent constructions may readily be adapted for use in my method and apparatus.

The nature and scope of my invention will be more fully understood from the following description taken in connection with the accompanying drawings forming part hereof, in which—

Fig. 4 is a cross-sectional view of the apparatus of Fig. 1.

Fig. 5 is a cross-sectional view of the apparatus and gin house illustrated in Fig. 2, and Fig. 6 is a cross-sectional view of the apparatus and gin house illustrated in Fig. 3.

Figure 1:
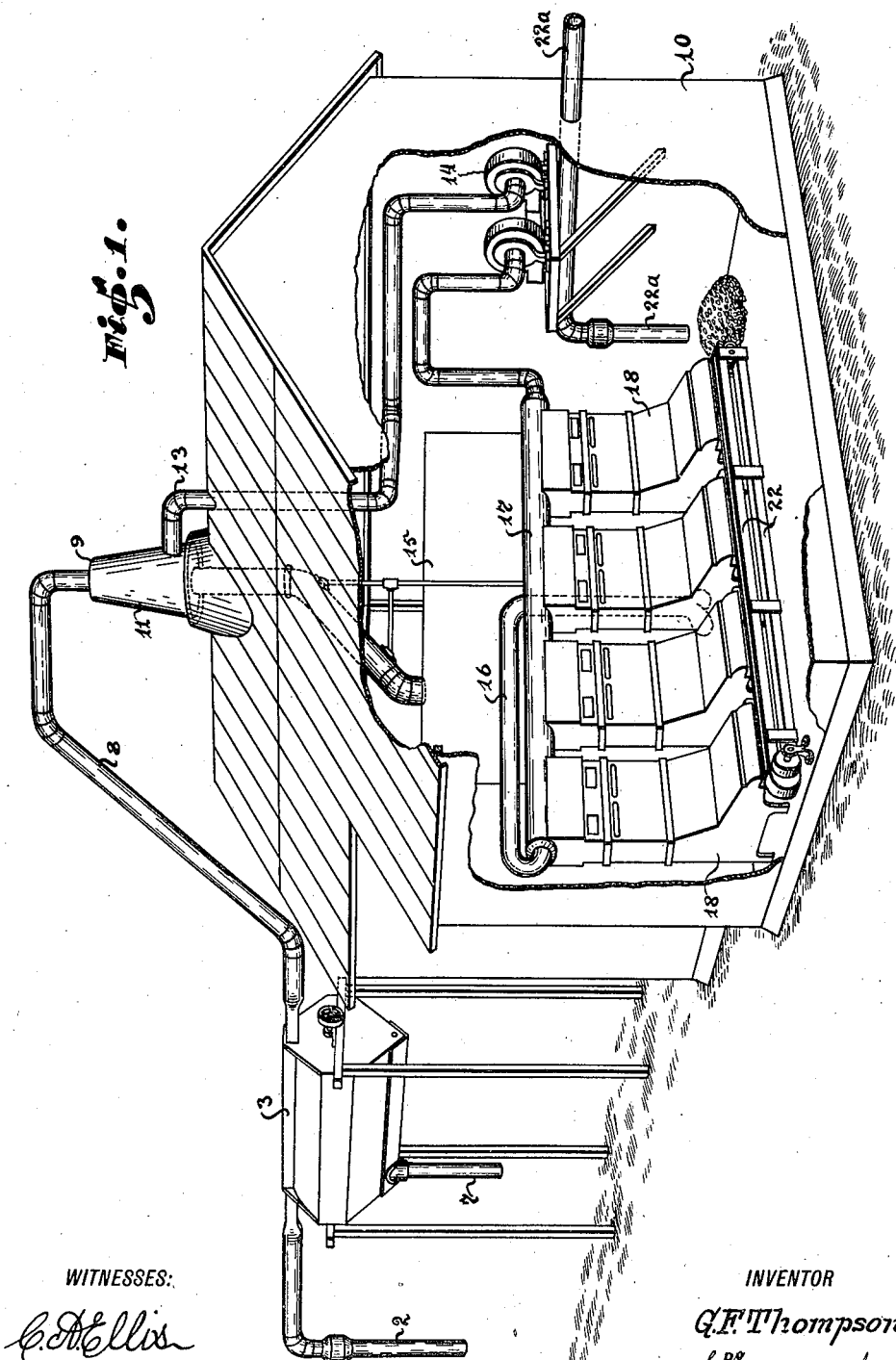
Figure 1 is a perspective view of that portion of my apparatus which is located outside and within the cotton storage house.
Figure 2:
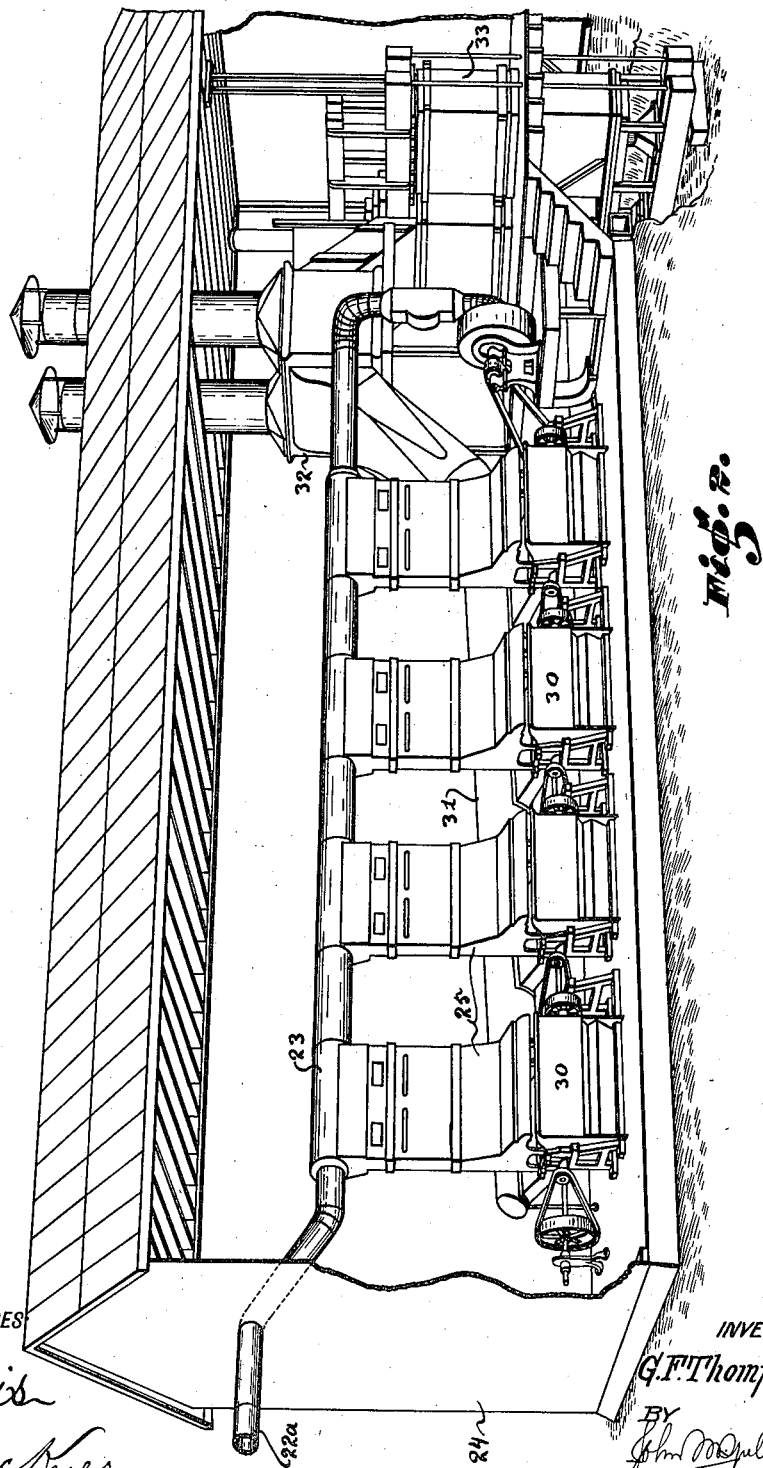
Fig. 2 is a perspective view of the interior of the gin house and of the remaining portion of my apparatus located therein, the two figures showing the complete apparatus, for carrying out my improved method of handling cotton.
Figure 3:
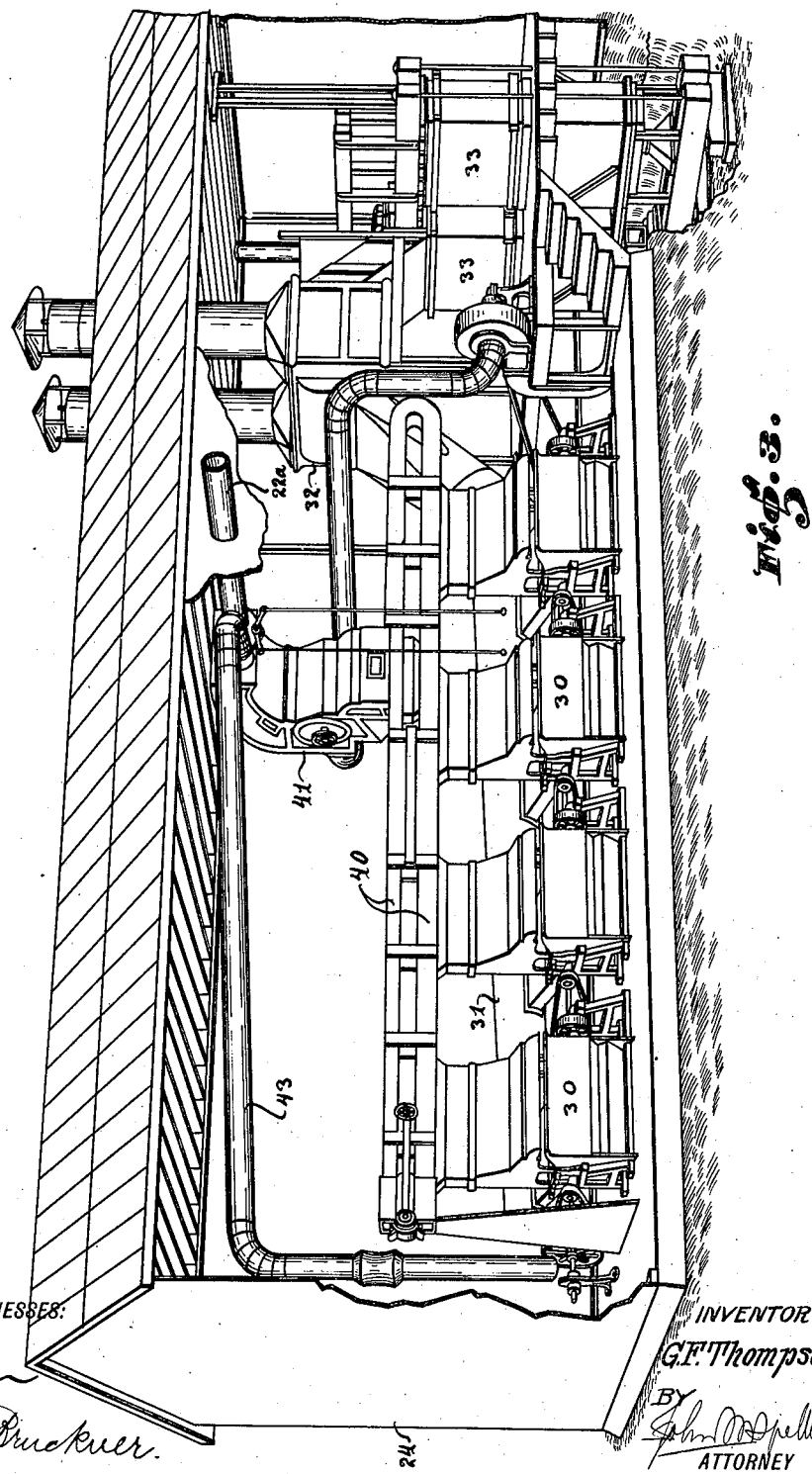
Fig. 3 is a view similar to Fig. 2 but illustrating the use of a belt distributer in place of the pneumatic conveyer illustrated in Fig. 2.

Referring to Figs. 1 and 4 of the drawings 1 represents a wagon from which the bolly cotton is removed by a suction pipe 2 to a cleaner 3. This cleaning apparatus 3 is of well known construction and in it the cotton is stirred by revolving blades 4 working against a screen floor 5. The shale, motes and loose dirt are forced through floor 5 to a screw conveyer 6 and to a pipe 7 leading to the ground. From cleaning apparatus 3 the partially cleaned cotton is sucked through pipe 8 to an elevating and distributing mechanism 9 situated in the top or roof of the cotton storage house 10. The elevating and distributing mechanism 9, known as a "dropper" consists of a funnel shaped chamber 11 divided by transverse perforated partition 12 into two compartments. The compartment below the partition 12 communicates by pipe 13 with a fan or other exhaust apparatus 14. The pipe 8 traverses the chamber 11 and its partition 12, that part of the pipe 8 which is within the compartment above the 12 being perforated as shown at $8^a$ to bring the pipe 8 under suction. The pipe 8 drops the cotton into a bin 15 in the cotton storage house 10. From bin 15 the cotton is sucked by pipe 16 to preferably a pneumatic conveyer and distributer 17. This pneumatic conveyer 17 leads to a series of boll breaking, cleaning and boll separating mechanisms 18, and feeds each of said mechanisms in succession. Inasmuch as the construction and operation of such a mechanism 18 for breaking, cleaning and separating the cotton boll is well known in the art detailed description of the parts is not necessary to a proper understanding of this invention. It will be sufficient to state that the cotton as it passes into the machine 18 from conveyer 17 is fed to a picker roll 19 thence over a screen 20 to a boll breaking and separating mechanism 21 and is finally discharged at base of mechanism 21 onto a belt drag or belt conveyer 22. This conveyer 22 takes the cotton to a part of the cotton storage house beneath a suction pipe, $22^a$ which conveys the cotton to a pneumatic conveyer 23 in the gin house. Referring now to Figs. 2, 3, 5, and 6, within the gin house 24 is arranged a series of cotton cleaning and feeding mechanisms 25, which so far as I am aware are, in function and use, new in the art, although to some extent the construction and operation of the parts are well known. The cotton as it leaves pipe $22^a$ enters the conveyer 23 and is fed to the feed rolls 26 and passed under a picker roll 27, and over a screen 28 to the feeding rolls 29. From these rolls 29 it passes directly into the gin 30. The cotton after it is ginned passes into lint flue 31 and condenser 32 and thence to the cotton press 33.

In the carrying out of my invention the pneumatic conveyer 17 and the pneumatic conveyer 23 may be replaced by a belt distributer in each instance. To avoid duplication I have shown in Figs. 3 and 6 the belt distributer substituted for the pneumatic conveyer 23 in the gin house but it is clear that the same or similar arrangement of belt distributer may be used in the cotton storage house to replace the pneumatic conveyer 17 if for any reason such replacement is desirable.

The construction and arrangement of the belt distributer 40 is well known. The cotton is passed from pipe $22^a$ into or through the vacuum box 41 of well known construction and is then fed onto the belt distributer 40. Overflow of cotton from the end of the distributer 40 is sucked up by pipe 43 and taken to the vacuum box 41 and fed to the distributer 40 until all portions of the cotton have gone into the cleaning and feeding mechanisms 25. In a similar manner when a belt distributer is used in place of the pneumatic conveyer 17 in storage house 10, the overflow is taken care of so that all portions of the cotton leaving the bin 15 must pass through the boll breaking, cleaning and separating mechanisms 18 before the cotton is conveyed to the gin house.

In the carrying out of my method or system of handling seed cotton, the first step is to cleanse the cotton from superficial dirt, that is to say from the shale, motes and dirt accumulated by the cotton during picking and transportation to the storage house. This preliminary cleaning is done outside the cotton storage house in the cleaning apparatus 3. The cotton cleaned of its surface impurities is then elevated by suction to the cotton dropper or distributer 9 at the top or roof of the cotton storage house 10 and thence dropped into bins in the house 10. This step of elevating and dropping the cotton permits of a thorough aeration of the cotton in transit to the cotton house and the cotton may be distributed to the various bins or receptacles in said house. The next step namely the passage of the cotton through the boll breaking, cleaning and separating mechanism 18 results in the thorough opening of the boll; the disentanglement of the cotton so that the fiber is in more or less combed condition; and the removal of interior dirt and external hulls from the cotton. The passage of this cotton through the boll breaking, cleaning and separating mechanism 18 also results in a change in the physical appearance of the cotton, since it comes from said mechanism 18 in a dry and silky condition. The partially prepared cotton is next conveyed through the cleaning and feeding mechanism 25 and in this step of the method the cotton is thoroughly cleansed and fed directly to the roll-forming chamber of the gin 30.

The cotton as it leaves the gin 30 is of very fine quality, its grade being raised several points. The lower the grade of the cotton to be treated the greater the increase which will result from treating the cotton by my improved method. From actual experience I have taken cotton of such low grade as to be practically valueless and ginned it into cotton readily classed as "low middling."

Having thus described the nature and scope of my invention what I claim as new and desire to secure by Letters Patent, is—

1. The method of treating bolly cotton comprising the subjecting of the initial crude product to a cleaning action to substantially free the same from shale, motes, dirt and the like, withdrawing the relatively clean product to an elevated point of discharge and liberating the same to fall from said point into an enlarged area enabling the cotton to spread and become aerated while depositing to a place within the influence of a withdrawing medium, withdrawing the material by said medium away from near the bottom of the deposit in said area and subjecting it to a boll-breaking separating and additional cleaning action, and ginning the resultant fiber.

2. The method of treating bolly cotton comprising the subjecting of the initial crude product to a cleaning action to substantially free the same from shale, motes, dirt and the like, withdrawing the relatively clean product to an elevated point of discharge and liberating the same to fall from said point into an enlarged area enabling the cotton to spread and become aerated while depositing to a place within the influence of a withdrawing medium, withdrawing the material by said medium away from near the bottom of the deposit in said area and subjecting it to a boll-breaking separating and additional cleaning action, withdrawing the product from the discharge region of said last mentioned action, and subjecting the same to an additional cleaning action and ginning the same.

3. The method of treating bolly cotton comprising the subjecting of the initial crude product to a cleaning action to substantially free the same from shale, motes, dirt and the like, withdrawing the relatively clean product to an elevated point of discharge and permitting the same to drop from said point and be aerated while approaching a place within the influence of a withdrawing medium, removing the material near the bottom of the deposit by said withdrawing medium and subjecting it to a boll-breaking, separating and additional cleaning action, and ginning the resultant fiber.

In testimony whereof I have signed my name to this specification in the presence of two subscribing witnesses.

GEORGE F. THOMPSON.

Witnesses:
 GEORGE H. PROVINE,
 JOSEPH F. DULANEY.